Sir W. THOMSON, Kt.
Device for Taking Azimuths.
No. 210,068.   Patented Nov. 19, 1878.
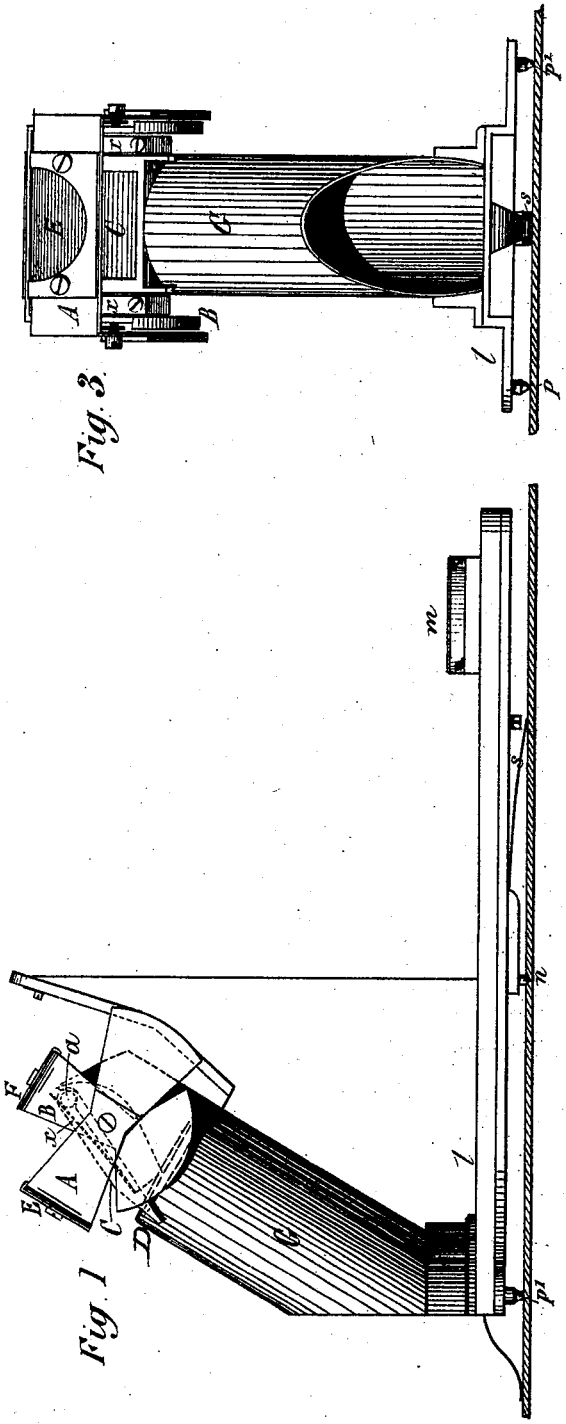
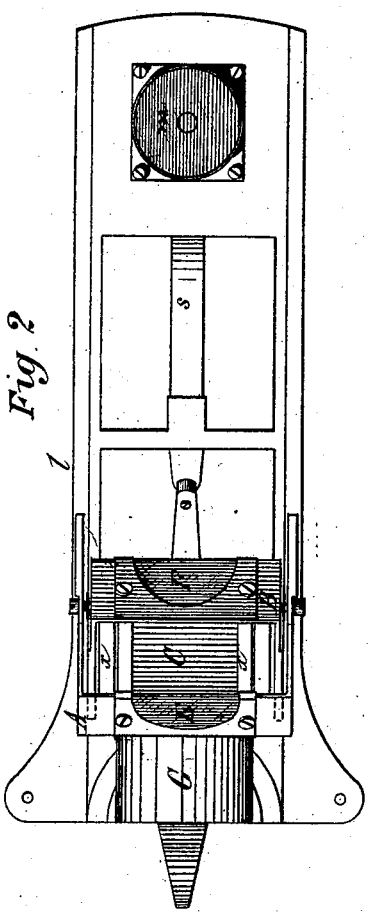
Witnesses
Chas J. Gooch
A. H. Galt
Inventor:
Sir William Thomson
Knight
By Knight Bros,
Attorneys.

UNITED STATES PATENT OFFICE.

SIR WILLIAM THOMSON, KNIGHT, OF GLASGOW, NORTH BRITAIN.

IMPROVEMENT IN DEVICES FOR TAKING AZIMUTHS.

Specification forming part of Letters Patent No. 210,068, dated November 19, 1878; application filed December 31, 1877; patented in England, December 18, 1876.

*To all whom it may concern:*

Be it known that I, Sir WILLIAM THOMSON, Knight, of Glasgow College, Doctor of Laws, and Professor of Natural Philosophy in the University and College of Glasgow, in the county of Lanark, North Britain, have invented an Improved Apparatus for Taking Azimuths, of which the following is a specification:

My invention consists in the apparatus for taking azimuths, and which I call the "azimuth-mirror."

In order that my said invention and the manner of applying it in practice may be fully understood, I have hereunto appended an explanatory sheet of drawings, whereon—

Figure 1 is a side elevation of my improved azimuth apparatus. Fig. 2 is a plan of the same, with the movable parts A and B in the position corresponding to Fig. 1; and Fig. 3 is an end elevation corresponding to Fig. 1.

The axis $a$, on which the mirror C is pivoted, is above the plane of the lens, which is contained within the inclined tubular leg G, and the position whereof is indicated by the dotted lines marked D in Fig. 1. This arrangement allows of the interval of no vision between mirror and lens to be reduced to a minimum, by reason of the inner straight edge of the mirror cutting out of sight with a sharp or fine line that portion of the lens which it hides, and thereby the image of the object is seen distinctly on the degree-scale of the compass-card.

The advantage resulting from the narrowing of the interval of no vision may also, obviously, be obtained by pivoting the mirror below the lens.

The azimuth-mirror is provided with two movable pieces, A and B, in which are carried the dark-colored glass shades E F, respectively. These shades are for obscuring any over-bright body, and one or both of them are used, according to the degree of obscuration necessary.

When using this part of my apparatus the lens is placed over the compass between the outer circumference and the center, with its axis directed to the graduated circumference of the compass-card.

The plane mirror C is for observing the image of the object whose azimuth is required, and it is movable about its horizontal axis $a$. The tubular leg G, carrying the lens D and mirror C, is placed on a frame, $l$, mounted on a geometrical slide to give it motion round an axis through the center of the compass-card perpendicular to the glass-cover. One rounded foot, $n$, rests in a conical hollow in the center of the glass cover. Two others, P P', press on the glass plate lightly, being caused to do so by the spring $s$, or by the center of gravity of the frames being very slightly on one side of $n$. The observer, when taking an azimuth, turns this frame round its vertical axis until the mirror C and lens D are fairly opposite to the object. He then places his eye above the compass and moves the mirror C about its horizontal axis until the image of the object reflected from the mirror is seen upon a division on the compass-card seen through the lens. The point on the compass-card where the object is seen will be the bearing of the object. This appliance is provided with a spirit-level, $m$, to show whether the case and bowl are properly balanced.

The azimuth-mirror may also be duplicated—that is to say, it may be constructed with a second leg, carrying mirror, shades, and lens, the two legs being at equal distances on opposite sides of the central pivot on which the instrument turns, the second leg and attachments being inclined in the opposite directions to that of the single azimuth-mirror shown, and at the same angle. This arrangement allows of bearings being taken simultaneously of two objects whose azimuths differ by one hundred and eighty degrees, or thereabout. Thus an observer is able to determine when he is in the line between two landmarks, (such as two light-houses,) and can at the same time ascertain the bearing of this line by his compass. From the known magnetic bearing of this line he is able to find the error of his compass for the course that the vessel is steering.

With respect to the pivoting of the axis $a$ of the mirror C, I prefer to effect that by forming the bearing of the axis or pivot of two straight sides at right angles to each other, or nearly so, (one side being horizontal, the other vertical,) and pressing the axis or pivot $a$ into this bearing by means of springs $x$. This arangement affords means of ready and accurate adjustment of the mirror by the use of a file on either of the straight sides of the bearings, so that when placed on a fixed horizontal glass plate it shall give the same azimuth for two distant points in one vertical line, and the correct azimuth for one of them, preferably one in a horizontal direction from the instrument. To make this adjustment, a glass plate, with a conical hollow like that in the cover of the compass-bowl, is fixed horizontally, upon which the instrument is to be placed. A fine thread is stretched from a point vertically under the middle of the central foot of the instrument horizontally to a fixed point at least several yards distant. Vertically over the fixed point another point is fixed, at such a height as to be seen from the instrument at an altitude of thirty degrees or more. The thread must be at or about the same distance below the glass as is the circumference of the circle of the compass-card. The file is used on one of the horizontal bearings of the mirror to make the lower point, as seen in the mirror, coincide with the horizontal thread seen through the lens at the point where it is cut by a circle corresponding to that of the compass-card. The mirror is next set to bring down the image of the upper fixed point to the circumference of this circle, (of which a short arc in black on white paper may conveniently be fixed in proper position below the glass,) and the file is now applied to one of the vertical faces of the bearings to bring the image of the upper fixed point to lie on the horizontal thread.

I claim—

The apparatus which I call my "azimuth-mirror," consisting of the tubular leg G and lens D, the mirror C, and movable shades A E, B F, and the level $m$, all mounted upon the frame $l$, provided with a central pivot, feet, and resting-springs, as herein shown and described.

In testimony whereof I have signed my name to this specification in the presence of two subscribing witnesses.

WILLIAM THOMSON. [L. S.]

Witnesses:
    DAVID DRYSDALE AUSTIN,
        115 *St. Vincent street, Glasgow.*
    ROBERT ADAM GUNN,
        115 *St. Vincent street, Glasgow.*